Oct. 24, 1967 R. KOSCHE 3,348,642
DISK BRAKE
Filed May 21, 1965
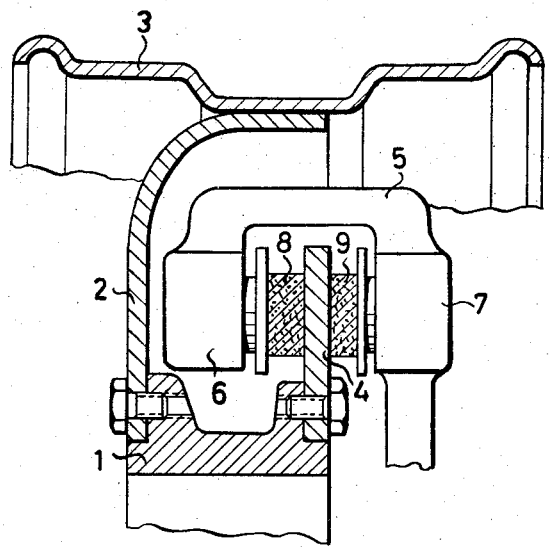
INVENTOR.
RUDOLF KOSCHE
BY Dicke & Craig
ATTORNEYS 3,348,642
DISK BRAKE
Rudolf Kosche, Schorndorf, Germany, assignor to Daimler-Benz Aktiengesellschaft, Stuttgart-Unterturkheim, Germany
Filed May 21, 1965, Ser. No. 457,631
Claims priority, application Germany, May 23, 1964, D 44,523
3 Claims. (Cl. 188—251)

The present invention relates to improvements in disk brakes, especially for the wheels of motor vehicles.

For attaining a good braking effect, it is conventional to make the brake linings of wheels of a material which has the highest possible coefficient of friction. Unfortunately, however, such brake linings have the disadvantage that they often cause squealing of the brakes when the latter are applied.

It is an object of the present invention to overcome this disadvantage. This object is attained according to the invention by providing the brake linings at the opposite sides of each brake disk of materials which have different coefficients of friction. Due to this difference in the friction values, the vibrations produced by the two brake linings also differ from and interfere with each other and thereby prevent or at least reduce the squealing of the brakes.

It is a well-known fact that brake linings with different coefficients of friction usually also have different degrees of wear resistance, and that brake linings with a higher coefficient of friction usually are also worn off more quickly.

It is a further object of the invention to insure that, even though the brake linings at the opposite sides of each brake disk should have different coefficients of friction, both brake linings will still have substantially the same degree of wear resistance. This is attained according to the invention by providing the brake lining which has the lower wear resistance, that is, the lining which usually has the higher coefficient of friction, on that side of the brake disk which is better protected from dust and dirt, that is, on the side facing the annular web of the wheel.

These features and advantages of the present invention will become further apparent from the following detailed description thereof which is to be read with reference to the accompanying diagrammatic drawing of one preferred embodiment of the invention.

In this drawing, the numeral 1 designates the hub of a conventional wheel of a motor vehicle to which the annular web 2 is secured which, in turn, carries the wheel rim 3. The brake disk 4 is likewise secured to the wheel hub 1. A brake saddle 5 which carries the hydraulic cylinders 6 and 7 surrounds the brake disk 4.

The outer brake lining 8 which is located on the outer side of the vehicle between the brake disk 4 and the web 2 has a very high coefficient of friction of, for example, 0.35, while the inner brake lining 9 at the other side of the brake disk 4 has a normal coefficient of friction of, for example, 0.25. The material of the outer brake lining 8 with the higher coefficient of friction has normally a lower wear resistance than the material of the inner brake lining and it would wear out, for example, in approximately two thirds of the length of time in which the material of the inner brake lining 9 would be worn out. However, since due to the web 2 the side of the brake disk 4 which faces the outer brake lining 8 is better protected than the side facing the brake lining 9 from the entry of wear-increasing dust and dirt from the outside, the actual wear upon the two brake linings will be substantially equal.

The advantageous results of the invention therefore are that, due to the different properties of the brake linings, the brake will no longer squeal and have a higher braking effect and the brake linings will be worn equally.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A disk brake arrangement, especially for a wheel of a motor vehicle having a frame, comprising at least two elements which are rotatable with respect to each other, one of said elements being stationary relative to said frame, another of said elements including a brake disk, one brake lining disposed on each side of said brake disk, the material of the lining disposed on one side of said brake disk having a coefficient of friction which differs substantially from that of the material of said lining disposed on the other side of said brake disk, whereby squealing of the brakes is effectively prevented.

2. A disk brake as defined in claim 1, in which one of said brake linings has a lower wear resistance than the other brake lining and is mounted at the side of said brake disk which is better protected from dust and dirt than the other side.

3. A disk brake as defined in claim 2, in which said wheel comprises an annular web, said brake disk being secured to and surrounded at one side by said web and being protected at said side by said web from the entry of dust and dirt from the outside, said brake lining with the higher coefficient of friction having a lower wear resistance than the other brake lining and being disposed at said protected side of said brake disk.

References Cited
UNITED STATES PATENTS

| | | | |
|---|---|---|---|
| 1,845,846 | 2/1932 | Norton. | |
| 2,135,126 | 11/1938 | Harwood | 192—68 X |
| 2,355,419 | 8/1944 | Bruce | 188—251 |
| 2,496,699 | 2/1950 | Clark. | |
| 2,504,077 | 4/1950 | Loudenslager. | |
| 2,713,923 | 7/1955 | Eksergian et al. | 188—251 |
| 3,213,986 | 10/1965 | Smirl | 192—107 X |

MILTON BUCHLER, *Primary Examiner.*

G. E. HALVOSA, *Assistant Examiner.*